May 27, 1924.
J. M. HOUGHLAND ET AL
WINDSHIELD CANOPY FOR AUTOMOBILES
Filed March 7, 1923
1,495,414
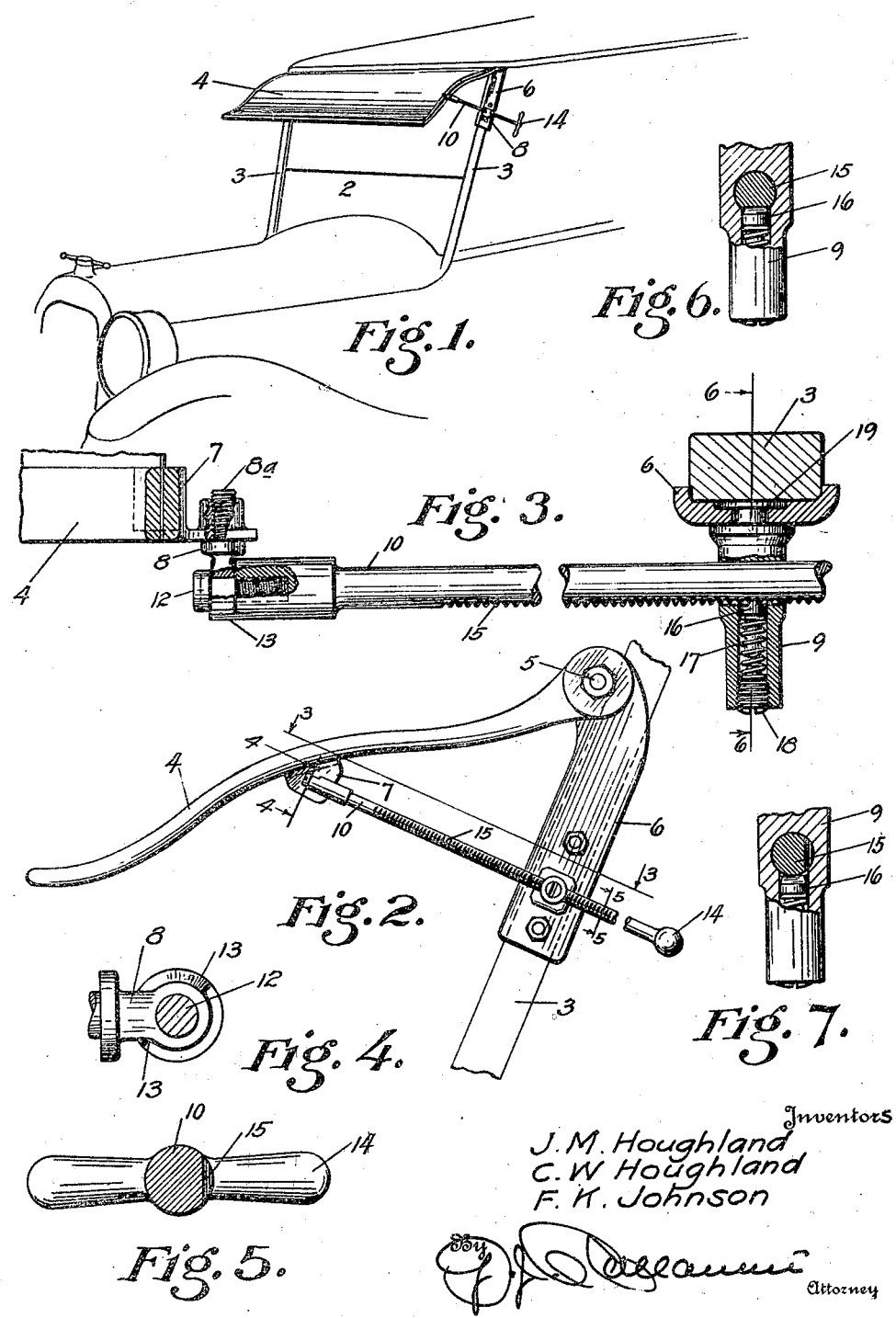
Inventors
J. M. Houghland
C. W. Houghland
F. K. Johnson
Attorney Patented May 27, 1924.

1,495,414

UNITED STATES PATENT OFFICE.

JOHN M. HOUGHLAND AND CLAIR W. HOUGHLAND, OF DENVER, COLORADO, AND FRANCIS K. JOHNSON, OF SARATOGA, WYOMING.

WINDSHIELD CANOPY FOR AUTOMOBILES.

Application filed March 7, 1923. Serial No. 623,429.

*To all whom it may concern:*

Be it known that we, JOHN M. HOUGHLAND, CLAIR W. HOUGHLAND, and FRANCIS K. JOHNSON, citizens of the United States, residing, respectively, at Denver, in the county of Denver and State of Colorado, at Denver, in the county of Denver and State of Colorado, and at Saratoga, in the county of Carbon, in the State of Wyoming, have invented certain new and useful Improvements in Windshield Canopies for Automobiles, of which the following is a specification.

Our invention relates to windshield canopies for motor driven vehicles and its primary object is to provide in connection with a light-intercepting and rain and snow deflecting shade hinged above the windshield of an automobile, a simple and efficient appliance for its manual adjustment to a selected angle.

Another object of the invention is to provide an adjusting mechanism of the above described character which is adapted to be operated from the driver's seat of the vehicle with little effort and without excessive motion of the hand or the use of separately adjusted locking and releasing elements, and still another object is to provide a mechanism which will effect the angular adjustment of a pivoted canopy of the above described type by partial rotation and longitudinal movement of a sustaining brace.

An additional advantageous feature of the invention is the simplicity and effectiveness of the means provided to mount the canopy and its adjusting mechanism in its operative relation to an automobile windshield.

With the above objects in view our invention resides in the construction and arrangement of parts fully set forth in the following detailed description and illustrated in the accompanying drawing which shows a preferred embodiment thereof.

In the drawings in the several views of which like parts are similarly designated—

Figure 1 represents a perspective view of the front portion of an automobile showing the canopy and its improved adjusting appliance in operative relation to the windshield thereof;

Figure 2, an enlarged end view of the canopy in its position on the windshield;

Figure 3, an enlarged fragmentary partially sectional elevation of the adjusting mechanism of the canopy looking in the direction of the arrows drawn across the line 3—3, Figure 2;

Figure 4, an enlarged fragmentary section taken on the line 4—4, Figure 2;

Figure 5, an enlarged transverse section of the brace-rod of the adjusting mechanism along the line 5—5, Figure 2;

Figure 6, a section taken on the line 6—6, Figure 3; and

Figure 7, a similar section showing the brace-rod in its unlocked position.

Referring more specifically to the drawings, the reference character 2 designates the windshield of a motor driven vehicle including the side-posts 3, and 4 the canopy which slants forwardly at the upper edge of the shield for the purpose of protecting the eyes of the occupants of the vehicle from the glare of the sun and of keeping the glass of the shield free from water or snow in stormy weather.

The canopy which preferably is composed of a pane of translucent material set in a metal frame of the required proportions, is in the improved construction pivotally mounted as at 5, between and at the upper ends of two channeled shoes adapted to embrace the side posts of the windshield, to which they are attached by bolts or other suitable means.

The appliance provided for the angular adjustment of the canopy by moving it about its pivotal axis, has been shown in the drawings as being applied at one of its ends only although two such appliances may be attached at opposite ends of the canopy if so desired.

Under ordinary conditions, however, one mechanism applied at one end of the canopy is sufficient for both its adjustment and its support in its adjusted positions.

The mechanism comprises an angular bracket 7 fastened at an end of the frame of the canopy, a post 8 swiveled on the bracket through the medium of a screw-threaded stem 8ª, a lock housing 9 pivoted to move about its longitudinal axis upon the corresponding shoe-member 6 on which the canopy is mounted, and a brace rod 10 which is rotatably supported on the post 8 by means of a screw bolt 12 engaging in a correspondingly tapped axial socket at an end thereof, and which passes slidably through a transverse opening of the housing 9.

The rod has adjacent is pivoted end two shoulders 13 which by engagement with the post 8 limit its rotary movement to a determinate angle, it is provided at its opposite end with a transverse handle 14 to facilitate its manual operation and it is furthermore provided with a series of transverse serrations or notches 15 which by co-operation with a locking bolt 16 in the housing 9, function to lock the rod and the canopy in their adjusted positions.

The locking bolt above referred to is disposed in a longitudinal bore of the housing and it is held in engagement with the rod by means of a coiled spring 17 which abuts against a screw-plug 18 in the outer end of the bore.

The housing is pivotally mounted on the shoe by means of a short stud 19 the end of which is countersunk in an enlargement of an opening of the shoe 6, in which the stud is rotatably fitted.

In the operation of our invention the rod 10 in its normal position as illustrated in the drawings, sustains the canopy and is locked against longitudinal displacement by the engagement of the spring-pressed bolt 16 with one of its serrations.

If it is desired to adjust the canopy to a different angle the operator turns the rod through the angle determined by the engagement of its shoulders 13 with the post 8, and thereby releases its serration from the detent of the locking bolt which now rests upon the smooth surface of the rod as illustrated in Figure 7. The rod in this position is free to slide through the opening of the housing which by movement about its longitudinal axis follows its angular displacement due to the pivotal movement of the canopy with which it is connected.

When by lengthwise movement of the rod the canopy has been moved to the desired angle with relation to the windshield, the rod is turned to its original position and is automatically locked by the re-engagement of the bolt with its serrated portion.

It will be evident that by the use of our invention as hereinabove described, the driver of an automobile is enabled to instantly vary the angle of inclination of the canopy with the minimum of effort and without in the least detracting his attention from the more important duty of guiding and controlling the movement of the vehicle, and that owing to the simplicity of the construction of the adjusting mechanism, it may be produced at low cost and remain indefinitely in an operative condition without repair or readjustment of its co-operating parts.

Having thus described our invention, what we claim and desire to secure by Letters Patent is:

1. The combination with a pivoted windshield canopy for automobiles, of an appliance for the angular adjustment of the canopy, comprising a sliding brace for the canopy, mounted to be rotated to either of two determinate positions, and a device co-operating with the brace in one of said positions, to lock it against longitudinal movement.

2. The combination with a pivoted windshield canopy for automobiles, of an appliance for the angular adjustment of the canopy, comprising a sliding notched brace for the canopy mounted to be rotated to either of two determinate positions, and a bolt cooperating with the notches of the brace in one of said positions, to automatically lock the brace against longitudinal movement.

3. The combination with a pivoted windshield canopy for automobiles and a relatively stationary support, of an appliance for the angular adjustment of the canopy, comprising a post swiveled at an end of the canopy, a notched brace supported on the post to be turned to either of two determinate positions, a pivoted lock-housing on the support having a transverse opening through which the brace extends, and an automatic locking bolt in the housing, adapted to engage in the notches of the brace.

4. The combination with a pivoted windshield canopy for automobiles and a relatively stationary support, of an appliance for the angular adjustment of the canopy, comprising a post swiveled at an end of the canopy, a notched brace supported on the post to be turned to either of two determinate positions, a pivoted lock-housing on the support on which the brace is slidably supported, and an automatic locking bolt in the housing adapted to engage with the notches of the brace.

5. The combination with a pivoted windshield canopy for automobiles and a relatively stationary support, of an appliance for the angular adjustment of the canopy, comprising a post swiveled at an end of the canopy, a notched brace rotatably supported on the post and having shoulders adapted to limit the arc of its rotation by engagement with the post, a pivoted lock housing on the support, on which the brace is slidably supported, and an automatic locking bolt in the housing adapted to engage with the notches of the brace.

6. In combination, a pair of shoes adapted to be fastened upon the side posts of an automobile windshield, a canopy pivoted on said shoes, and an appliance for angular adjustment of the canopy, comprising a post swiveled at an end of the canopy, a notched brace supported on the post to be turned to either of two determinate positions, a pivoted lock housing on one of the shoes, on which the brace is slidably supported, and an automatic locking bolt in the housing, adapted to engage with the notches of the brace.

In testimony whereof we have affixed our signatures.

JOHN M. HOUGHLAND.
CLAIR W. HOUGHLAND.
FRANCIS K. JOHNSON.